(12) United States Patent
Abdollahian et al.

(10) Patent No.: US 11,361,473 B1
(45) Date of Patent: Jun. 14, 2022

(54) INCLUDING A PHYSICAL OBJECT BASED ON CONTEXT

(71) Applicant: Apple Inc., Cupertino, CA (US)

(72) Inventors: Golnaz Abdollahian, San Francisco, CA (US); Krishna Dayanidhi, Mountain View, CA (US); Patrick Dillon, Sunnyvale, CA (US); Aaron R. Zinman, Cupertino, CA (US)

(73) Assignee: Apple Inc., Cupertino, CA (US)

(*) Notice: Subject to any disclaimer, the term of this patent is extended or adjusted under 35 U.S.C. 154(b) by 51 days.

(21) Appl. No.: 16/984,862

(22) Filed: Aug. 4, 2020

Related U.S. Application Data

(60) Provisional application No. 62/905,951, filed on Sep. 25, 2019.

(51) Int. Cl.
| | |
|---|---|
| *G06T 11/00* | (2006.01) |
| *G06F 3/01* | (2006.01) |
| *G06T 7/70* | (2017.01) |
| *G06F 3/16* | (2006.01) |
| *G10L 15/18* | (2013.01) |
| *G10L 15/22* | (2006.01) |

(52) U.S. Cl.
CPC .............. *G06T 11/00* (2013.01); *G06F 3/017* (2013.01); *G06F 3/167* (2013.01); *G06T 7/70* (2017.01); *G10L 15/1815* (2013.01); *G10L 15/22* (2013.01)

(58) Field of Classification Search
None
See application file for complete search history.

(56) References Cited

U.S. PATENT DOCUMENTS

2020/0051336 A1* 2/2020 Ichikawa .............. G06T 19/006
2021/0327156 A1* 10/2021 Bramwell ............... G06F 3/011

* cited by examiner

*Primary Examiner* — Yi Wang
(74) *Attorney, Agent, or Firm* — Dentons US LLP

(57) ABSTRACT

The present disclosure relates to techniques for techniques for including a physical object in a computer-generated reality environment. A context associated with the computer-generated reality environment is identified and a physical object located in a real environment is detected. If the detected physical object is associated with the context of the computer-generated reality environment, then the computer-generated reality environment is displayed with a representation of the physical object inserted into the computer-generated reality environment.

25 Claims, 9 Drawing Sheets

INCLUDING A PHYSICAL OBJECT BASED ON CONTEXT

CROSS-REFERENCE TO RELATED APPLICATIONS

This application claims the benefit of U.S. Provisional Application No. 62/905,951, filed Sep. 25, 2019, the entire contents of which are hereby incorporated by reference.

FIELD

This application relates generally to computer-generated reality environments, and more specifically to techniques for including a physical object in a computer-generated reality environment based on context.

BACKGROUND

Computers can completely project or partially superimpose computer-generated images on a user's view to provide a computer-generated reality environment that can be experienced by the user. An electronic device optionally detects the user's real movements and projects and simulates those movements within a series of visual images or video of the computer-generated reality environment. Through these movements projected or simulated within the computer-generated reality environment, the user can appear to move within the computer-generated reality environment.

BRIEF SUMMARY

The present disclosure describes techniques for including a physical object in a computer-generated reality environment based on context. In some examples, the physical object is automatically included when the physical object is associated with a context of the computer-generated reality environment. These techniques, as described herein, enhance user convenience and provide the user with an enhanced degree of awareness by, in some exemplary embodiments, allowing the physical object to be visible to the user of the computer-generated reality environment when the physical object is contextually relevant.

In accordance with some embodiments, a method is described. The method includes: at an electronic device with a display device: displaying, via the display device, a computer-generated reality environment; identifying a context associated with the computer-generated reality environment; detecting a physical object located in a real environment; in accordance with a determination that the detected physical object is associated with the context of the computer-generated reality environment, displaying the computer-generated reality environment with a representation of the physical object inserted into the computer-generated reality environment; and in accordance with a determination that the detected physical object is not associated with the context of the computer-generated reality environment, displaying the computer-generated reality environment without the representation of the physical object.

In accordance with some embodiments, a non-transitory computer-readable storage medium storing one or more programs configured to be executed by one or more processors of an electronic device with a display device is described. The one or more programs include instructions for: displaying, via the display device, a computer-generated reality environment; identifying a context associated with the computer-generated reality environment; detecting a physical object located in a real environment; in accordance with a determination that the detected physical object is associated with the context of the computer-generated reality environment, displaying the computer-generated reality environment with a representation of the physical object inserted into the computer-generated reality environment; and in accordance with a determination that the detected physical object is not associated with the context of the computer-generated reality environment, displaying the computer-generated reality environment without the representation of the physical object.

In accordance with some embodiments, a transitory computer-readable storage medium storing one or more programs configured to be executed by one or more processors of an electronic device with a display device is described. The one or more programs include instructions for: displaying, via the display device, a computer-generated reality environment; identifying a context associated with the computer-generated reality environment; detecting a physical object located in a real environment; in accordance with a determination that the detected physical object is associated with the context of the computer-generated reality environment, displaying the computer-generated reality environment with a representation of the physical object inserted into the computer-generated reality environment; and in accordance with a determination that the detected physical object is not associated with the context of the computer-generated reality environment, displaying the computer-generated reality environment without the representation of the physical object.

In accordance with some embodiments, an electronic device comprising a display device, one or more processors, and memory storing one or more programs configured to be executed by the one or more processors is described. The one or more programs include instructions for: displaying, via the display device, a computer-generated reality environment; identifying a context associated with the computer-generated reality environment; detecting a physical object located in a real environment; in accordance with a determination that the detected physical object is associated with the context of the computer-generated reality environment, displaying the computer-generated reality environment with a representation of the physical object inserted into the computer-generated reality environment; and in accordance with a determination that the detected physical object is not associated with the context of the computer-generated reality environment, displaying the computer-generated reality environment without the representation of the physical object.

In accordance with some embodiments, an electronic device is described. The electronic device includes: a display device; means for displaying, via the display device, a computer-generated reality environment; means for identifying a context associated with the computer-generated reality environment; detecting a physical object located in a real environment; means for, in accordance with a determination that the detected physical object is associated with the context of the computer-generated reality environment, displaying the computer-generated reality environment with a representation of the physical object inserted into the computer-generated reality environment; and means for, in accordance with a determination that the detected physical object is not associated with the context of the computer-generated reality environment, displaying the computer-generated reality environment without the representation of the physical object.

DETAILED DESCRIPTION

Figure 1A:
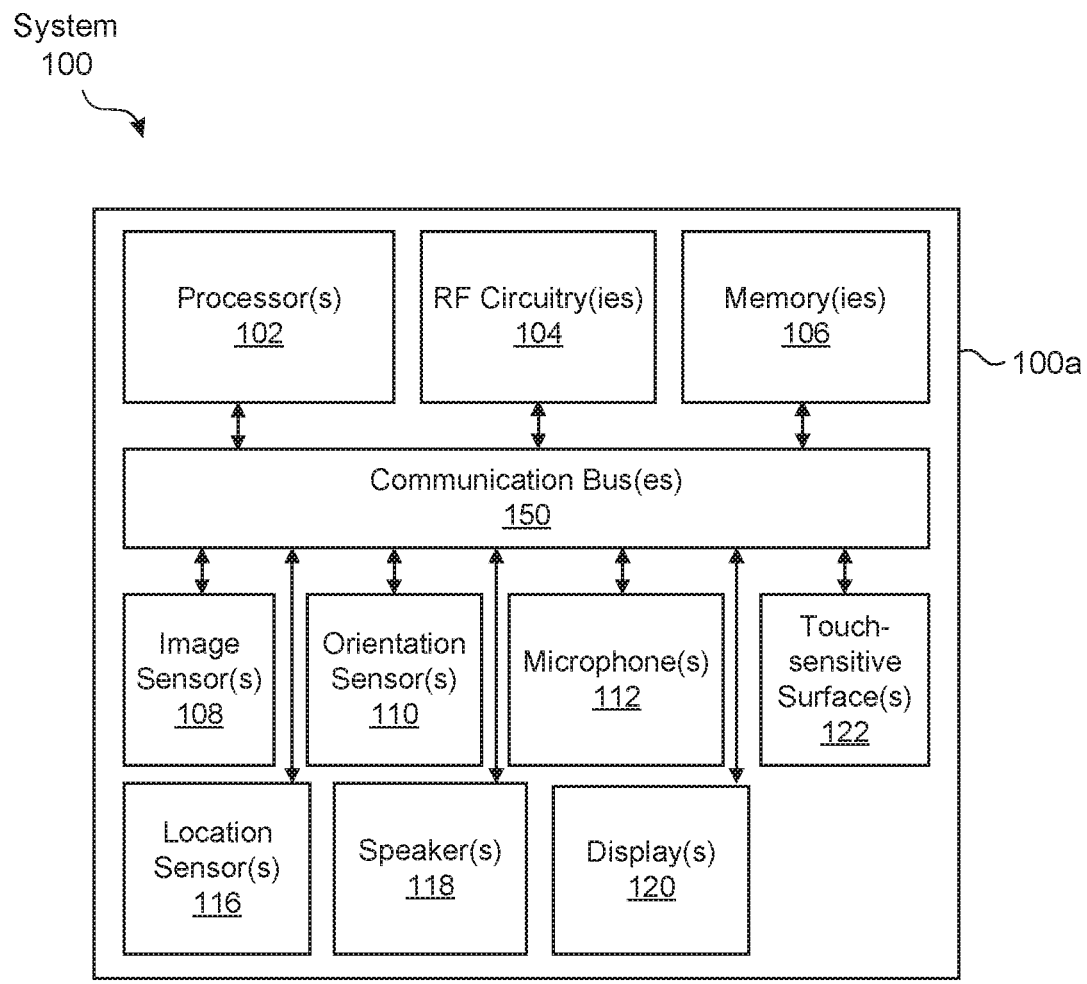
FIGS. 1A-1B depict exemplary systems for use in various computer-generated reality technologies.

Various examples of electronic systems and techniques for using such systems in relation to various computer-generated reality technologies are described.

A physical environment (or real environment) refers to a physical world that people can sense and/or interact with without aid of electronic systems. Physical environments, such as a physical park, include physical articles (or physical objects or real objects), such as physical trees, physical buildings, and physical people. People can directly sense and/or interact with the physical environment, such as through sight, touch, hearing, taste, and smell.

In contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands).

A person may sense and/or interact with a CGR object using any one of their senses, including sight, sound, touch, taste, and smell. For example, a person may sense and/or interact with audio objects that create a 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects.

Examples of CGR include virtual reality and mixed reality.

A virtual reality (VR) environment (or virtual environment) refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, an MR environment is anywhere between, but not including, a wholly physical environment at one end and a VR environment at the other end.

In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof), For example, a system may account for movements so that a virtual tree appears stationary with respect to the physical ground.

Examples of MR include augmented reality and augmented virtuality.

An augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment.

An AR environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof.

An augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

There are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, uLEDs, liquid crystal on silicon, laser scanning light source, or any combination of these technologies. The medium may be an optical waveguide, a hologram medium, an optical combiner, an optical reflector, or any combination thereof. In one example, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

Figure 1B:
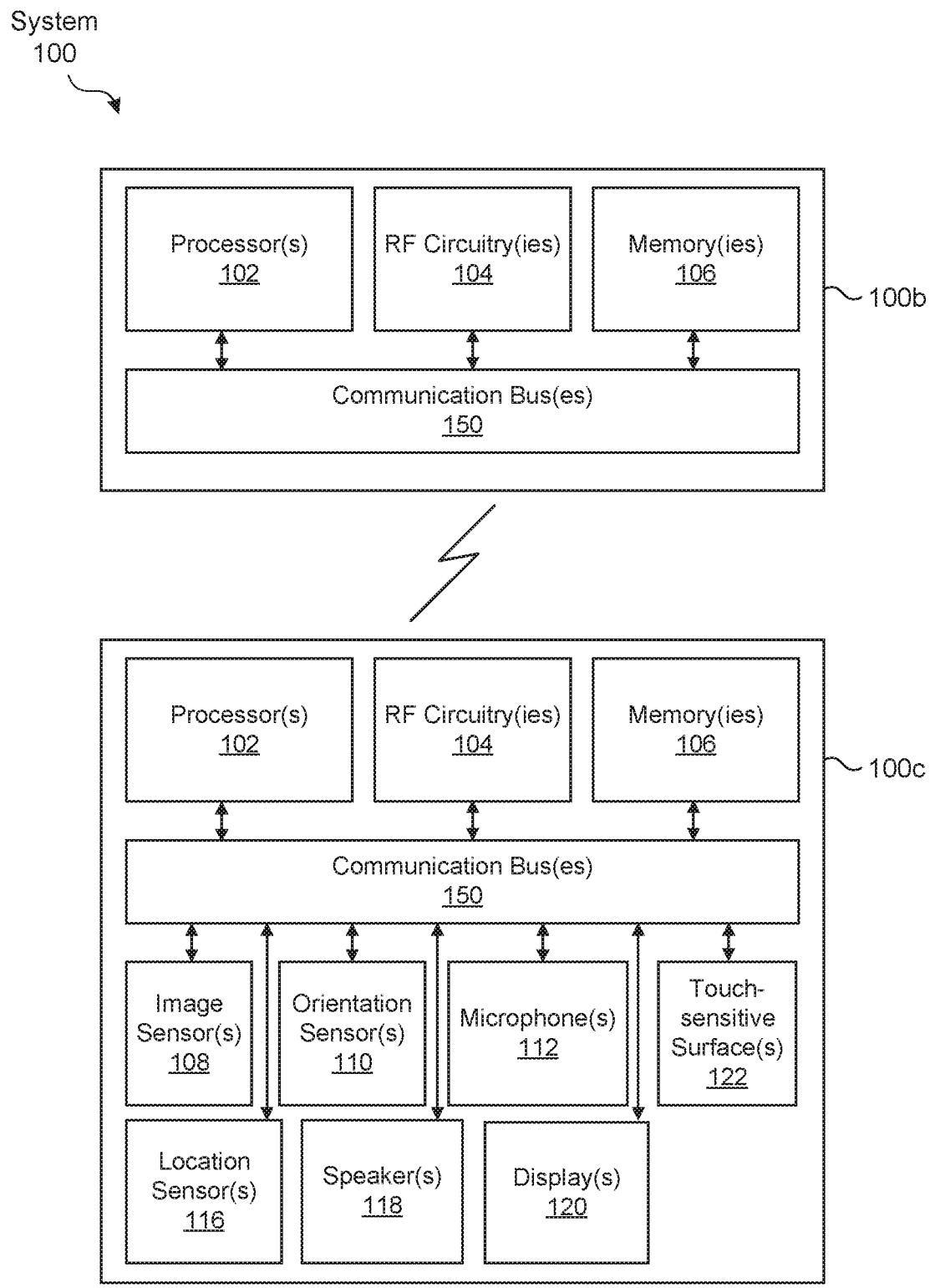

FIG. 1A and FIG. 1B depict exemplary system 100 for use in various computer-generated reality technologies.

In some examples, as illustrated in FIG. 1A, system 100 includes device 100a. Device 100a includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100a.

In some examples, elements of system 100 are implemented in a base station device (e.g., a computing device, such as a remote server, mobile device, or laptop) and other elements of the system 100 are implemented in a head-mounted display (HMD) device designed to be worn by the user, where the HMD device is in communication with the base station device. In some examples, device 100a is implemented in a base station device or a HMD device.

As illustrated in FIG. 1B, in some examples, system 100 includes two (or more) devices in communication, such as through a wired connection or a wireless connection. First device 100b (e.g., a base station device) includes processor(s) 102, RF circuitry(ies) 104, and memory(ies) 106. These components optionally communicate over communication bus(es) 150 of device 100b. Second device 100c (e.g., a head-mounted device) includes various components, such as processor(s) 102, RF circuitry(ies) 104, memory(ies) 106, image sensor(s) 108, orientation sensor(s) 110, microphone(s) 112, location sensor(s) 116, speaker(s) 118, display(s) 120, and touch-sensitive surface(s) 122. These components optionally communicate over communication bus(es) 150 of device 100c.

In some examples, system 100 is a mobile device. In some examples, system 100 is a head-mounted display (HMD) device. In some examples, system 100 is a wearable HUD device.

System 100 includes processor(s) 102 and memory(ies) 106. Processor(s) 102 include one or more general processors, one or more graphics processors, and/or one or more digital signal processors. In some examples, memory(ies) 106 are one or more non-transitory computer-readable storage mediums (e.g., flash memory, random access memory) that store computer-readable instructions configured to be executed by processor(s) 102 to perform the techniques described below.

System 100 includes RF circuitry(ies) 104. RF circuitry(ies) 104 optionally include circuitry for communicating with electronic devices, networks, such as the Internet, intranets, and/or a wireless network, such as cellular networks and wireless local area networks (LANs). RF circuitry(ies) 104 optionally includes circuitry for communicating using near-field communication and/or short-range communication, such as Bluetooth®.

System 100 includes display(s) 120. In some examples, display(s) 120 include a first display (e.g., a left eye display panel) and a second display (e.g., a right eye display panel), each display for displaying images to a respective eye of the user. Corresponding images are simultaneously displayed on the first display and the second display. Optionally, the corresponding images include the same virtual objects and/or representations of the same physical objects from different viewpoints, resulting in a parallax effect that provides a user with the illusion of depth of the objects on the displays. In some examples, display(s) 120 include a single display. Corresponding images are simultaneously displayed on a first area and a second area of the single display for each eye of the user. Optionally, the corresponding images include the same virtual objects and/or representations of the same physical objects from different viewpoints, resulting in a parallax effect that provides a user with the illusion of depth of the objects on the single display.

In some examples, system 100 includes touch-sensitive surface(s) 122 for receiving user inputs, such as tap inputs and swipe inputs. In some examples, display(s) 120 and touch-sensitive surface(s) 122 form touch-sensitive display(s).

System 100 includes image sensor(s) 108. Image sensors(s) 108 optionally include one or more visible light image sensor, such as charged coupled device (CCD) sensors, and/or complementary metal-oxide-semiconductor (CMOS) sensors operable to obtain images of physical objects from the real environment. Image sensor(s) also optionally include one or more infrared (IR) sensor(s), such as a passive IR sensor or an active IR sensor, for detecting infrared light from the real environment. For example, an active IR sensor includes an IR emitter, such as an IR dot emitter, for emitting infrared light into the real environment. Image sensor(s) 108 also optionally include one or more event camera(s) configured to capture movement of physical objects in the real environment. Image sensor(s) 108 also optionally include one or more depth sensor(s) configured to detect the distance of physical objects from system 100. In some examples, system 100 uses CCD sensors, event cameras, and depth sensors in combination to detect the physical environment around system 100. In some examples, image sensor(s) 108 include a first image sensor and a second image sensor. The first image sensor and the second image sensor are optionally configured to capture images of physical objects in the real environment from two distinct perspectives. In some examples, system 100 uses image sensor(s) 108 to receive user inputs, such as hand gestures. In some examples, system 100 uses image sensor(s) 108 to detect the position and orientation of system 100 and/or display(s) 120 in the real environment. For example, system 100 uses image sensor(s) 108 to track the position and orientation of display(s) 120 relative to one or more fixed objects in the real environment.

In some examples, system 100 includes microphones(s) 112. System 100 uses microphone(s) 112 to detect sound from the user and/or the real environment of the user. In some examples, microphone(s) 112 includes an array of microphones (including a plurality of microphones) that optionally operate in tandem, such as to identify ambient noise or to locate the source of sound in space of the real environment.

System 100 includes orientation sensor(s) 110 for detecting orientation and/or movement of system 100 and/or display(s) 120. For example, system 100 uses orientation sensor(s) 110 to track changes in the position and/or orientation of system 100 and/or display(s) 120, such as with respect to physical objects in the real environment. Orientation sensor(s) 110 optionally include one or more gyroscopes and/or one or more accelerometers.

Figure 2:
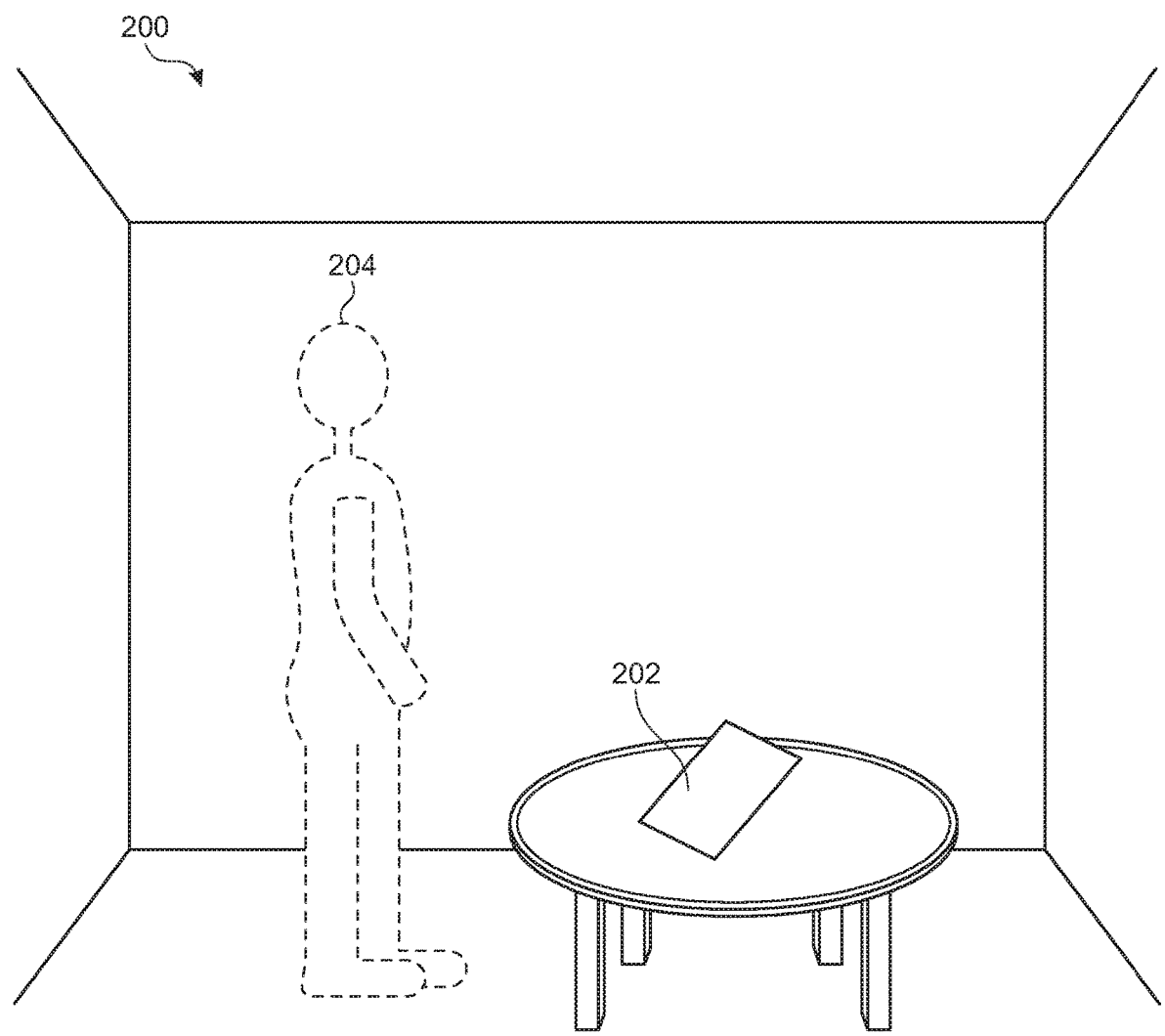
FIG. 2 illustrates an example of a physical environment.

FIG. 2 illustrates an example of a physical environment 200. Physical environment 200 includes a physical object 202. In the example shown in FIG. 2, physical object 202 is an object placed on a physical table (e.g., a magazine, a book, a bag), however it should be understood that physical object 202 can be any physical object in physical environment 200. The location of a user 204 in physical environment 200 is also shown. User 204 is a user of system 100 (described in reference to FIGS. 1A and 1B) that enables user 204 to sense and/or interact with various CGR environments.

In some embodiments, physical object 202 is detected with image sensor(s) 108 (e.g., camera(s) and/or depth sensor(s)) of system 100 to determine the location of physical object 202 in physical environment 200. In some embodiments, details about physical object 202 (e.g., issue of the magazine, name of the book, brand/model of bag) are also identified (e.g., by system 100).

In some embodiments, physical object 202 is associated with certain contexts. For example, if physical object 202 is a wedding magazine, then physical object 202 is associated with contexts pertaining to a wedding. As another example, if physical object 202 is a cookbook, then physical object 202 is associated with contexts pertaining to cooking.

Figure 3A:
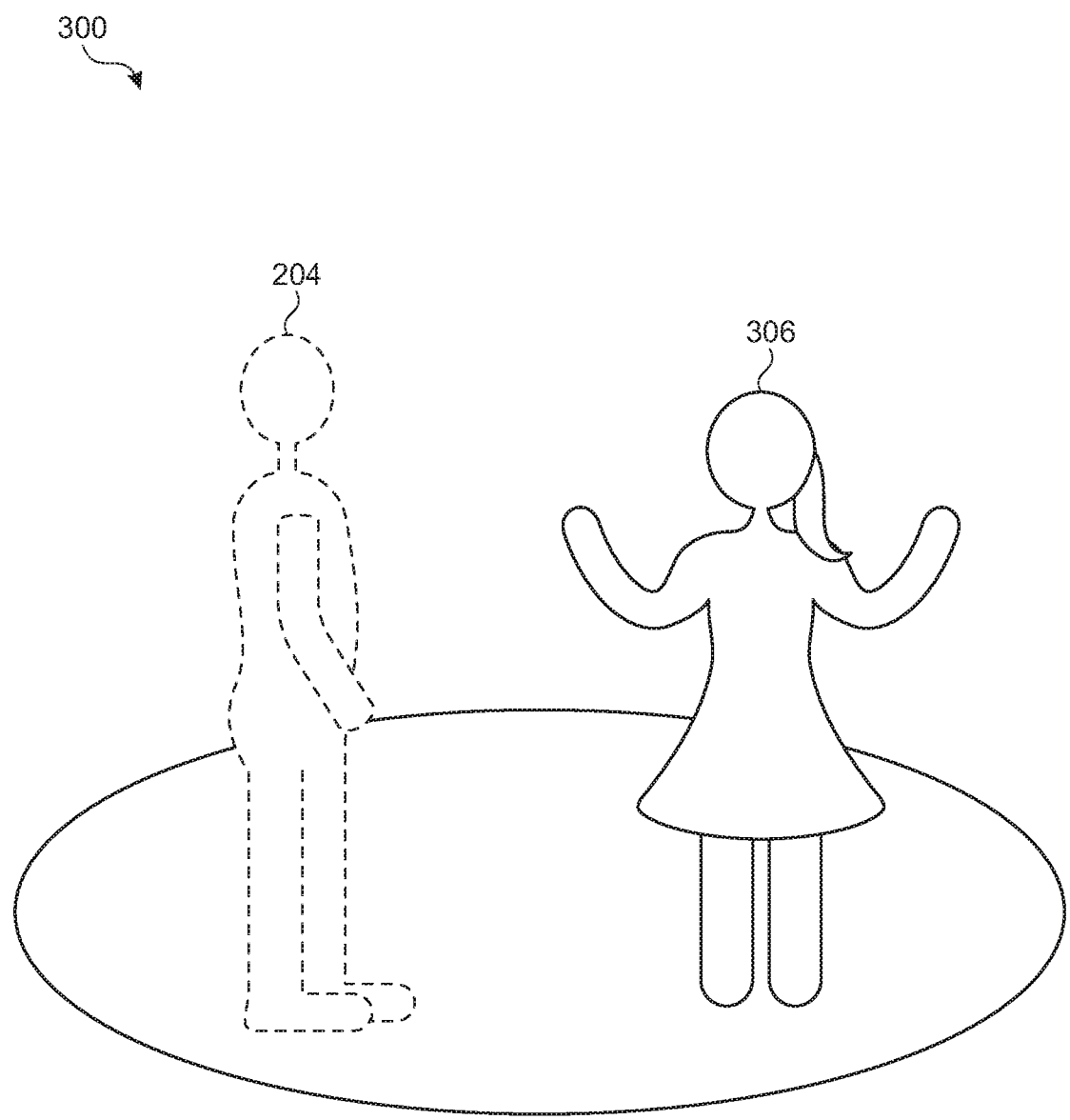
FIGS. 3A-3C illustrate examples of a computer-generated reality environment.
Figure 3B:
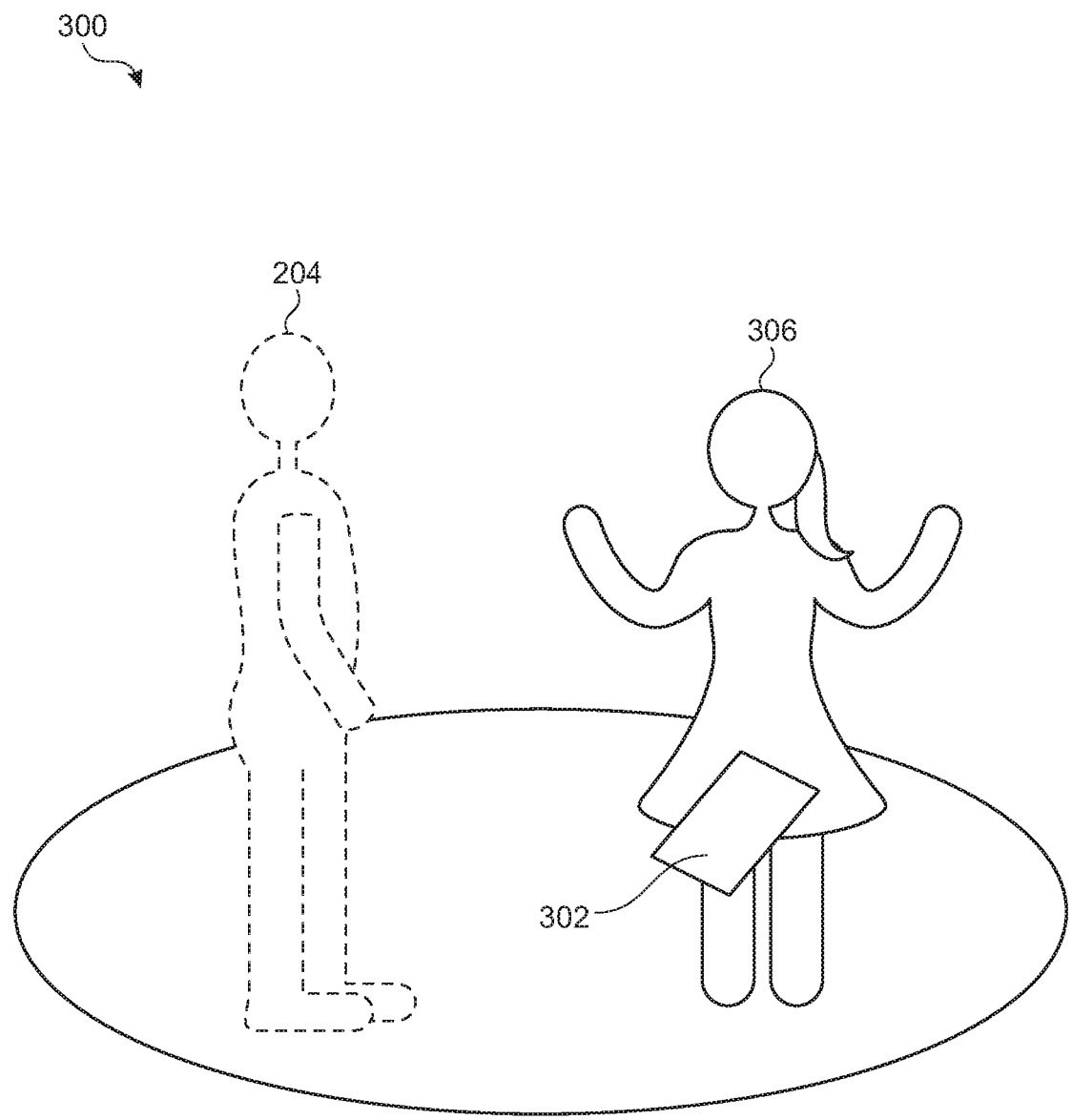
Figure 3C:
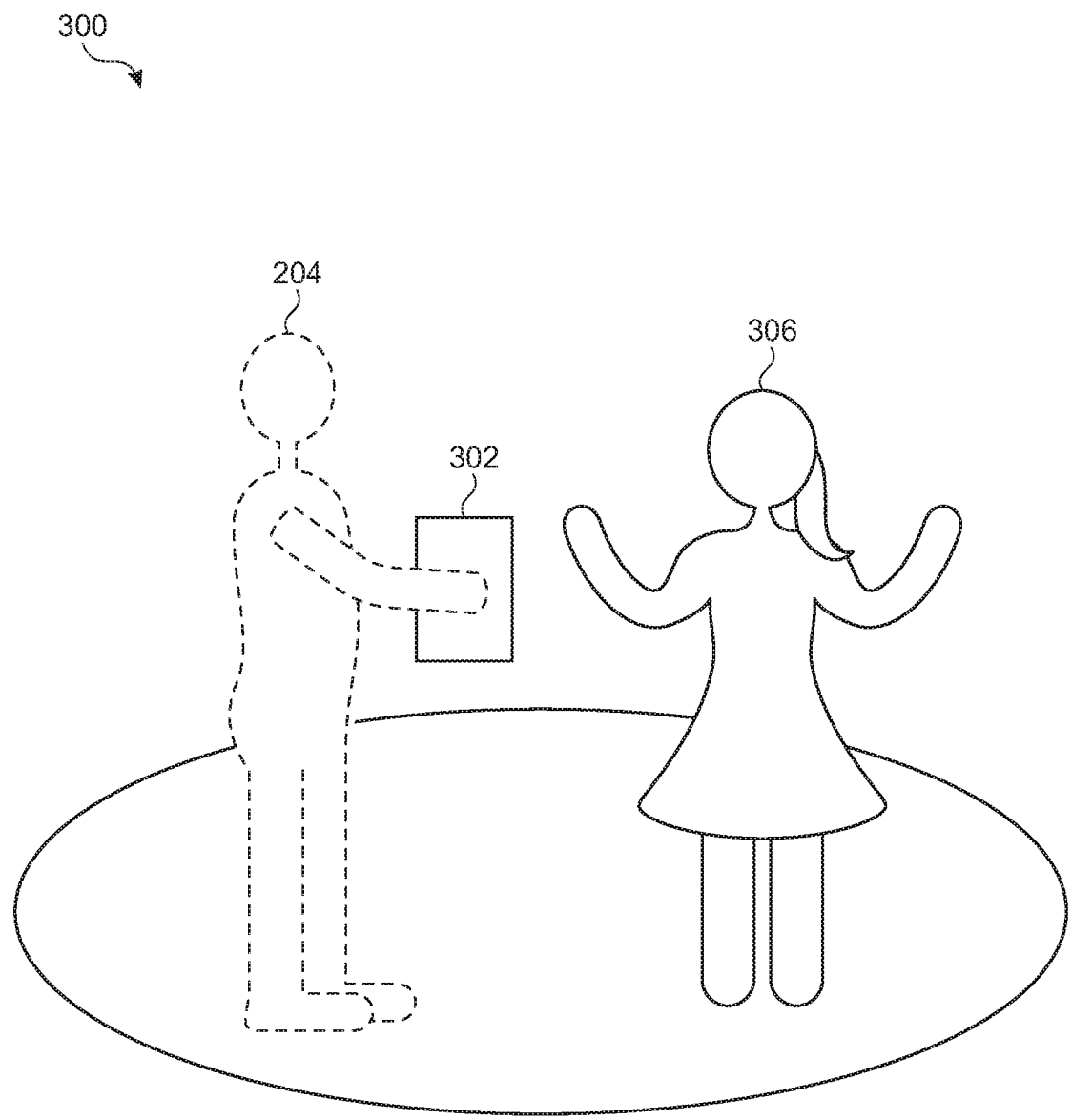

FIGS. 3A-3C illustrate examples of a CGR environment 300. In some embodiments, CGR environment 300 is displayed via a display device (e.g., display(s) 120) of system 100. The location of a user 204 participating in CGR environment 300 is shown. In some embodiments, CGR environment 300 is a computer-generated multi-user environment that allows user 204 to interact with an avatar 306 of another user or of an automated character. In some embodiments, a representation of user 204 (e.g., a user's avatar) is included in CGR environment 300. While CGR environment 300 is shown from a third-person perspective in FIGS. 3A-3C, it should be understood that, in some embodiments, CGR environment 300 is displayed from the perspective of user 204.

As user 204 participates in CGR environment 300, a context associated with CGR environment 300 is identified. In some embodiments, the context associated with CGR environment 300 is identified based on an application being utilized by user 204. For example, if user 204 is utilizing a cooking application that provides cooking instructions or ingredients, then the context associated with CGR environment 300 is identified as "cooking". In some embodiments, the context associated with CGR environment 300 is identified based on speech from user 204 or another user or avatar. For example, if a conversation between user 204 and avatar 306 is detected that pertains to a wedding, then the context associated with CGR environment 300 is identified as "wedding". In some embodiments, the context associated with CGR environment 300 is identified based on an activity of user 204. For example, if user 204 is detected preparing a meal, then the context associated with CGR environment 300 is identified as "cooking". In some embodiments, the context associated with CGR environment 300 is identified based on the participants in the CGR environment. For example, if one of the participants is a wedding planner, then the context associated with CGR environment 300 is identified as "wedding". In some embodiments, the context associated with CGR environment 300 is identified based on historical information corresponding to CGR environment 300. For example, if user 204 previously participated in CGR environment 300 to discuss planning a wedding with avatar 306, then the context associated with CGR environment 300 is identified as "wedding" based on the history between user 204 and avatar 306. In some embodiments, a combination of techniques for identifying the context associated with CGR environment 300 are used.

As shown in FIG. 3B, a representation 302 of physical object 202 is included in CGR environment 300. Representation 302 of physical object 202 is included in CGR environment 300 in response to determining that physical object 202 is associated with a context of CGR environment 300 (and, optionally, that physical object 202 is within physical environment 200 of user 204, such as within a predetermined distance to user 204). In some embodiments, representation 302 of physical object 202 is included in CGR environment 300 in response to a determination that physical object 202 and CGR environment are associated with the same or similar contexts. For example, if physical object 202 is a wedding magazine, and the context associated with CGR environment 300 is "wedding", then a representation 302 of the wedding magazine is included in CGR environment 300. As another example, if physical object 202 is a cookbook, and the context associated with CGR environment 300 is "cooking", then a representation 302 of the cookbook is included in CGR environment 300.

In some embodiments, the determination that physical object 202 is associated with the context of CGR environment 300 is based on user speech. For example, if a user says something about physical object 202 (e.g., "check out my new purse" when physical object 202 is a purse), then representation 302 of physical object 202 is included in CGR environment 300.

In some embodiments, representation 302 of physical object 202 is included in CGR environment 300 by displaying CGR environment 300 with pass-through video of physical object 202 inserted into CGR environment 300 at a location corresponding to the physical location of physical object 202 in physical environment 200. In some embodiments, representation 302 of physical object 202 is included in CGR environment 300 by displaying CGR environment 300 with a three-dimensional model of physical object 202 inserted into CGR environment 300 at a location corresponding to the physical location of physical object 202 in physical environment 200.

FIG. 3C illustrates an example of representation 302 of physical object 202 being included in CGR environment 300 in response to detection of a user gesture. In some embodiments, the user gesture includes picking up or otherwise moving physical object 202 in physical environment 200. In some embodiments, the user gesture includes a motion indicating pertinence of physical object 202 (e.g., pointing a finger at the physical object, nodding at the physical object, directing eye gaze at the physical object). Based on the user gesture, physical object 202 is determined to be associated with the context of CGR environment 300 and is included in CGR environment 300.

In some embodiments, prior to including representation 302 of physical object 202 in CGR environment 300 as shown in FIGS. 3B and 3C, a notification is provided that physical object 202 is to be included. In some embodiments, the notification is a semi-transparent representation of physical object 202. In some embodiments, the notification is a displayed pop-up message. In some embodiments, the notification is visible to user 204 and not to other users of CGR environment 300. In some embodiments, after a predetermined amount of time after providing the notification, representation 302 of physical object 202 is included in CGR environment 300 (e.g., even if no user confirmation is received). In some embodiments, after providing the notification, a user confirmation (e.g., user gesture, vocal confirmation) is received confirming that representation 302 of physical object 202 should be included in CGR environment 300. In some embodiments, representation 302 of physical object 202 is not included in CGR environment 300 unless a user confirmation is received. Accordingly, user 204 can control whether a representation of a physical object is introduced into CGR environment 300.

Figure 4:
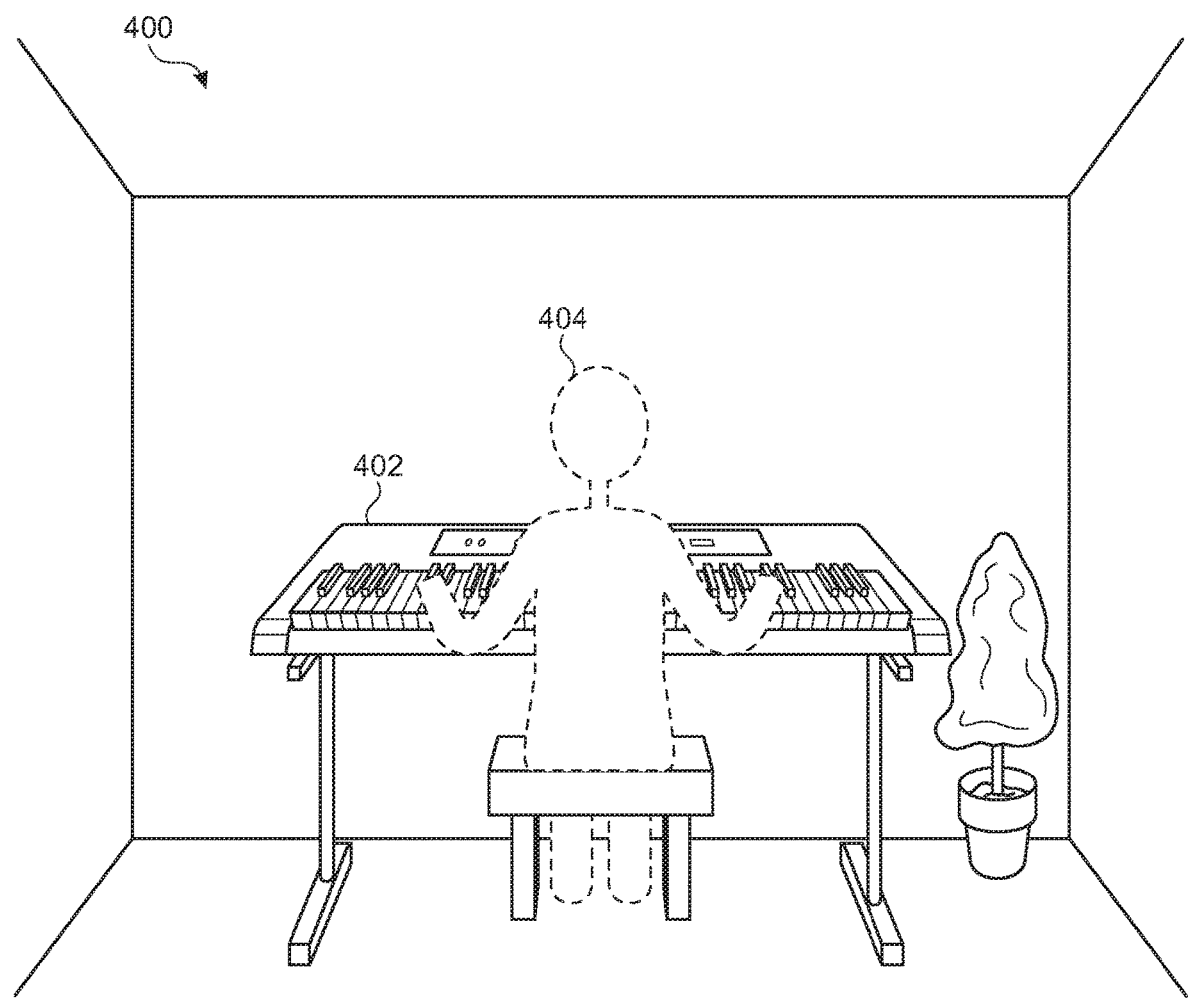
FIG. 4 illustrates an example of a physical environment.

FIG. 4 illustrates an example of a physical environment 400. Physical environment 400 includes a physical object 402. In the example shown in FIG. 4, physical object 402 is a musical instrument (e.g., a piano) with which user 404 is interacting. User 404 is a user of system 100 (described in reference to FIGS. 1A and 1B) that enables user 404 to sense and/or interact with various CGR environments.

In some embodiments, physical object 402 is detected with image sensor(s) 108 (e.g., camera(s) and/or depth sensor(s)) of system 100 to determine the location of physical object 402 in physical environment 400. In some embodiments, details about physical object 402 (e.g., model of instrument) are also identified. In some embodiments, physical object 402 is associated with certain contexts. For example, physical object 402 is associated with contexts pertaining to music performance or music instruction.

Figure 5:
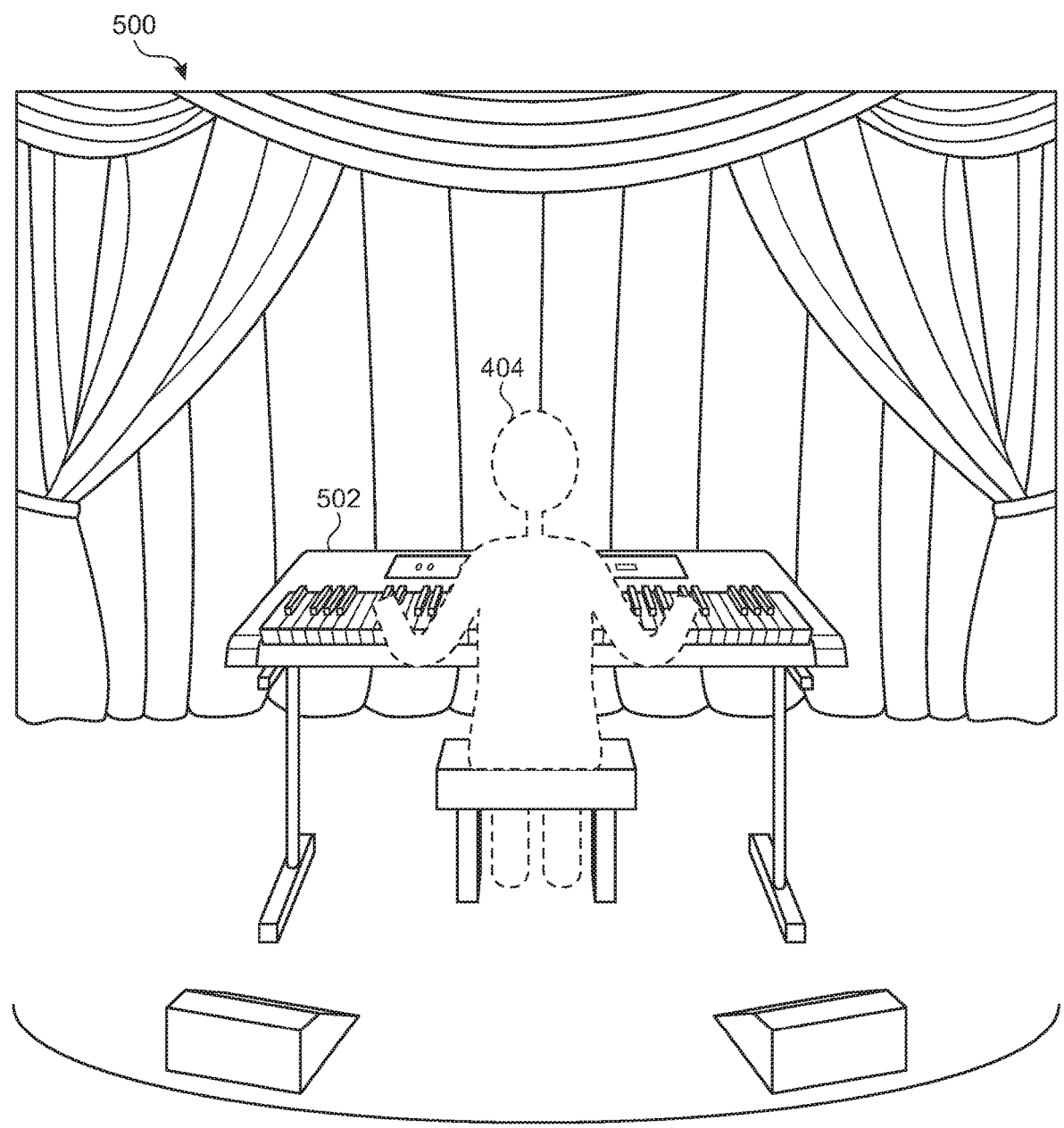
FIG. 5 illustrates an example of a computer-generated reality environment.

FIG. 5 illustrates an example of a CGR environment 500. In some embodiments, CGR environment 500 is displayed via a display device (e.g., display(s) 120) of system 100. The location of a user 404 participating in CGR environment 500 is shown. In some embodiments, CGR environment 500 is a computer-generated music performance environment (e.g., a concert stage) that allows user 404 to practice and/or receive instruction for a musical instrument. In some embodiments, a representation of user 404 (e.g., a user's avatar) is included in CGR environment 500. While CGR environment 500 is shown from a third-person perspective in FIG. 5, it should be understood that, in some embodiments, CGR environment 500 is displayed from the perspective of user 404.

As shown in FIG. 5, a representation 502 of physical object 402 is included in CGR environment 500. Representation 502 of physical object 402 is included in CGR environment 500 in response to a determination that physical object 402 and CGR environment are associated with the same or similar contexts. In some embodiments, the context associated with CGR environment 500 is determined based on the type of environment being used for CGR environment 500. For example, as shown in FIG. 5, CGR environment 500 is a concert stage, which results in the context of CGR environment 500 being identified as pertaining to music performance or music instruction. In some embodiments, the context associated with CGR environment 500 is identified based on an application being utilized by user 404. For example, if user 404 is utilizing a music instruction application, then the context associated with CGR environment 500 is identified as pertaining to music instruction. In some embodiments, the context associated with CGR environment 500 is identified based on an activity of user 404. For example, if user 404 is detected playing an instrument, then the context associated with CGR environment 500 is identified as pertaining to music performance or music instruction. In some embodiments, the context associated with CGR environment 500 is identified based on the participants in the CGR environment. For example, if one of the participants is a music teacher, then the context associated with CGR environment 500 is identified as pertaining to music instruction. In some embodiments, the context associated with CGR environment 500 is identified based on historical information corresponding to CGR environment 500. For example, if user 404 previously participated in CGR environment 500 to receive music instruction, then the context associated with CGR environment 500 is identified as pertaining to music instruction based on the previous activity in CGR environment 500. In some embodiments, a combination of techniques for identifying the context associated with CGR environment 500 are used.

In some embodiments, representation 502 of physical object 402 is included in CGR environment 500 by displaying CGR environment 500 with pass-through video of physical object 402 inserted into CGR environment 500 at a location corresponding to the physical location of physical object 402 in physical environment 400. In some embodiments, representation 502 of physical object 402 is included in CGR environment 500 by displaying CGR environment 500 with a three-dimensional model of physical object 402 inserted into CGR environment 500 at a location corresponding to the physical location of physical object 402 in physical environment 400.

Figure 6:
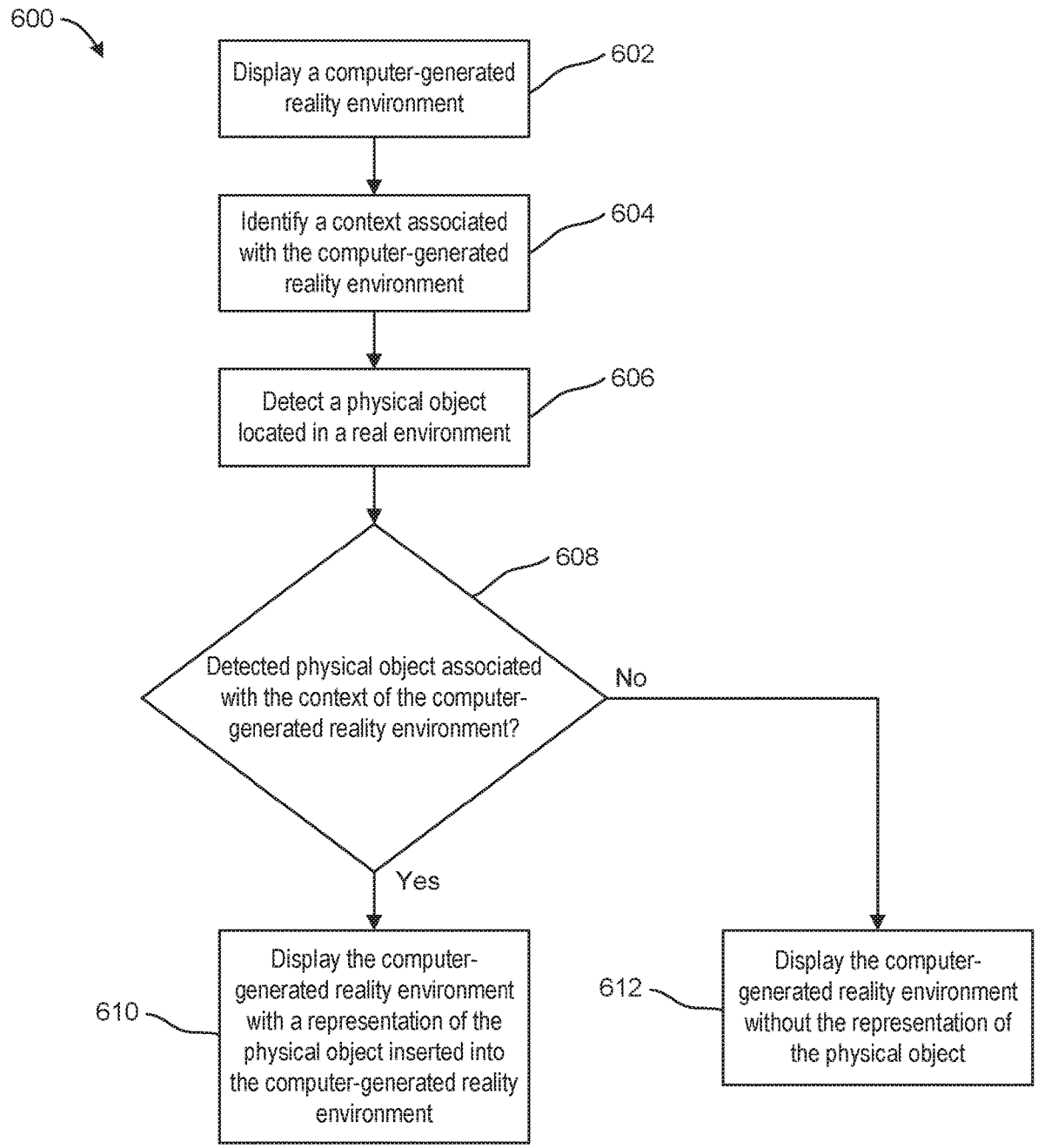
FIG. 6 is a flow diagram illustrating an exemplary process performed by an electronic device.

FIG. 6 is a flow diagram illustrating an exemplary process 600 performed by an electronic device (e.g., device 100a), in accordance with some embodiments. In some embodiments, the electronic device has a display device (e.g., display(s) 120). In some embodiments, the electronic device is connected to and in communication with a display device (e.g., display(s) 120) that is separate from the device. In some embodiments, the electronic device has one or more sensor devices (e.g., image sensor(s) 108). In some embodiments, the electronic device is connected to and in communication with one or more sensor devices (e.g., image sensor(s) 108) that are separate from the device.

At block 602, the electronic device displays, via the display device, a computer-generated reality environment (e.g., 300, 500).

At block 604, the electronic device identifies a context associated with the computer-generated reality environment (e.g., a conversation topic, wedding planning, music lesson, cooking). In some embodiments, identifying the context associated with the computer-generated reality environment includes identifying participants in the computer-generated reality environment (e.g., music teacher, wedding planner). In some embodiments, identifying the context associated with the computer-generated reality environment includes identifying an application being utilized at the electronic device (e.g., music lesson app). In some embodiments, identifying the context associated with the computer-generated reality environment includes detecting a conversation topic (e.g., wedding, cooking). In some embodiments, identifying the context associated with the computer-generated reality environment includes detecting an activity (e.g., playing an instrument, cooking). In some embodiments, the context associated with the computer-generated reality environment is based on historical information (e.g., previous activities of the participants in the computer-generated reality environment).

At block 606, the electronic device detects (e.g., with image sensor(s) 108) a physical object (e.g., 202, 402) (e.g., the topic of conversation (e.g., new purse), wedding magazine, instrument, recipe) located in a real environment (e.g., 200, 400).

At block 608, the electronic device determines whether the detected physical object is associated with the context of the computer-generated reality environment (e.g., the physical object is relevant to an activity currently taking place in the computer-generated reality environment).

At block 610, in accordance with a determination that the detected physical object is associated with the context of the computer-generated reality environment, the electronic device displays the computer-generated reality environment with a representation (e.g., 302, 502) of the physical object (e.g., pass-through video of the physical object, a 3D model of the physical object) inserted into the computer-generated reality environment (e.g., at a location corresponding to the real-world location of the physical object). In some embodiments, the determination that the physical object is associated with the context of the computer-generated reality environment is based on a user gesture (e.g., picking up the physical object, pointing at the physical object, a gaze directed at the physical object). In some embodiments, the determination that the physical object is associated with the context of the computer-generated reality environment is based on user speech (e.g., user speech about the physical object ("check out my new purse")). Displaying the computer-generated reality environment with a representation of the physical object inserted into the computer-generated reality environment enhances user convenience and provides the user with an enhanced degree of awareness by, for example, allowing the physical object to be visible to the user of the computer-generated reality environment when the physical object is contextually relevant.

In some embodiments, in accordance with the determination that the physical object is associated with the context of the computer-generated reality environment and prior to displaying the computer-generated reality environment with the representation of the physical object, the electronic device provides a notification that the representation of the physical object is to be included in the computer-generated reality environment (e.g., a semi-transparent version of the physical object, a pop-up window).

At block 612, in accordance with a determination that the detected physical object is not associated with the context of the computer-generated reality environment (e.g., the physical object is not relevant to the activity currently taking place in the computer-generated reality environment), the electronic device displays the computer-generated reality environment without the representation of the physical object.

Executable instructions for performing the features of process 600 described above are, optionally, included in a transitory or non-transitory computer-readable storage medium (e.g., memory(ies) 106) or other computer program product configured for execution by one or more processors (e.g., processor(s) 102).

As described above, one aspect of the present technology is the gathering and use of data available from various sources to identify a physical object and determine the context of a CGR environment. The present disclosure contemplates that in some instances, this gathered data may include personal information data that uniquely identifies or can be used to contact or locate a specific person. Such personal information data can include demographic data, location-based data, telephone numbers, email addresses, twitter IDs, home addresses, data or records relating to a user's health or level of fitness (e.g., vital signs measurements, medication information, exercise information), date of birth, or any other identifying or personal information.

The present disclosure recognizes that the use of such personal information data, in the present technology, can be used to the benefit of users. For example, the personal information data can be used to include physical objects in a CGR environment that are contextually relevant to a user. Accordingly, use of such personal information data enables users to have an improved experience with the CGR environment. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of or access to certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates examples in which users selectively block the use of, or access to, personal information data. That is, the present disclosure contemplates that hardware and/or software elements can be provided to prevent or block access to such personal information data. For example, determining the context of a CGR environment, the present technology can be configured to allow users to select to "opt in" or "opt out" of participation in the collection of personal information data during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure broadly covers use of personal information data to implement one or more various disclosed examples, the present disclosure also contemplates that the various examples can also be implemented without the need for accessing such personal information data. That is, the various examples of the present technology are not rendered inoperable due to the lack of all or a portion of such personal information data. For example, context of a CGR environment can be determined based on non-personal information data or publicly available information.

The foregoing descriptions of specific embodiments have been presented for purposes of illustration and description. They are not intended to be exhaustive or to limit the scope of the claims to the precise forms disclosed, and it should be understood that many modifications and variations are possible in light of the above teaching.

What is claimed is:

1. An electronic device, comprising:
   a display device;
   one or more processors; and
   memory storing one or more programs configured to be executed by the one or more processors, the one or more programs including instructions for:
   displaying, via the display device, a computer-generated reality environment in a first state, wherein the display device is located in a real environment with a physical object, and wherein the computer-generated reality environment in the first state is displayed without a representation of the physical object;
   identifying a context associated with the computer-generated reality environment;
   detecting, via one or more sensors of the electronic device, the physical object located in the real environment;
   in accordance with a determination that the detected physical object is associated with the context of the computer-generated reality environment, displaying, via the display device, the computer-generated reality environment in a second state with a representation of the physical object inserted into the computer-generated reality environment; and
   in accordance with a determination that the detected physical object is not associated with the context of the computer-generated reality environment, displaying, via the display device, the computer-generated reality environment in the first state without the representation of the physical object.

2. The electronic device of claim 1, wherein the determination that the physical object is associated with the context of the computer-generated reality environment is based on a user gesture.

3. The electronic device of claim 1, wherein the determination that the physical object is associated with the context of the computer-generated reality environment is based on user speech.

4. The electronic device of claim 1, wherein identifying the context associated with the computer-generated reality environment includes identifying participants in the computer-generated reality environment.

5. The electronic device of claim 1, wherein identifying the context associated with the computer-generated reality environment includes identifying an application being utilized at the electronic device.

6. The electronic device of claim 1, wherein identifying the context associated with the computer-generated reality environment includes detecting a conversation topic.

7. The electronic device of claim 1, wherein identifying the context associated with the computer-generated reality environment includes detecting an activity.

8. The electronic device of claim 1, wherein the context associated with the computer-generated reality environment is based on historical information.

9. The electronic device of claim 1, wherein the one or more programs further include instructions for:
   in accordance with the determination that the physical object is associated with the context of the computer-generated reality environment and prior to displaying the computer-generated reality environment in the second state with the representation of the physical object, providing a notification that the representation of the physical object is to be included in the computer-generated reality environment.

10. A non-transitory computer-readable storage medium storing one or more programs configured to be executed by one or more processors of an electronic device with a display device, the one or more programs including instructions for:
    displaying, via the display device, a computer-generated reality environment in a first state, wherein the display device is located in a real environment with a physical object, and wherein the computer-generated reality environment in the first state is displayed without a representation of the physical object;

identifying a context associated with the computer-generated reality environment;

detecting, via one or more sensors of the electronic device, the physical object located in the real environment;

in accordance with a determination that the detected physical object is associated with the context of the computer-generated reality environment, displaying, via the display device, the computer-generated reality environment in a second state with a representation of the physical object inserted into the computer-generated reality environment; and in accordance with a determination that the detected physical object is not associated with the context of the computer-generated reality environment, displaying, via the display device, the computer-generated reality environment in the first state without the representation of the physical object.

11. The non-transitory computer-readable storage medium of claim 10, wherein the determination that the physical object is associated with the context of the computer-generated reality environment is based on a user gesture.

12. The non-transitory computer-readable storage medium of claim 10, wherein the determination that the physical object is associated with the context of the computer-generated reality environment is based on user speech.

13. The non-transitory computer-readable storage medium of claim 10, wherein identifying the context associated with the computer-generated reality environment includes identifying participants in the computer-generated reality environment.

14. The non-transitory computer-readable storage medium of claim 10, wherein identifying the context associated with the computer-generated reality environment includes identifying an application being utilized at the electronic device.

15. The non-transitory computer-readable storage medium of claim 10, wherein identifying the context associated with the computer-generated reality environment includes detecting a conversation topic.

16. The non-transitory computer-readable storage medium of claim 10, wherein identifying the context associated with the computer-generated reality environment includes detecting an activity.

17. The non-transitory computer-readable storage medium of claim 10, wherein the context associated with the computer-generated reality environment is based on historical information.

18. A method, comprising:

at an electronic device with a display device:

displaying, via the display device, a computer-generated reality environment in a first state, wherein the display device is located in a real environment with a physical object, and wherein the computer-generated reality environment in the first state is displayed without a representation of the physical object;

identifying a context associated with the computer-generated reality environment;

detecting, via one or more sensors of the electronic device, the physical object located in the real environment;

in accordance with a determination that the detected physical object is associated with the context of the computer-generated reality environment, displaying, via the display device, the computer-generated reality environment in a second state with a representation of the physical object inserted into the computer-generated reality environment; and in accordance with a determination that the detected physical object is not associated with the context of the computer-generated reality environment, displaying, via the display device, the computer-generated reality environment in the first state without the representation of the physical object.

19. The method of claim 18, wherein the determination that the physical object is associated with the context of the computer-generated reality environment is based on a user gesture.

20. The method of claim 18, wherein the determination that the physical object is associated with the context of the computer-generated reality environment is based on user speech.

21. The method of claim 18, wherein identifying the context associated with the computer-generated reality environment includes identifying participants in the computer-generated reality environment.

22. The method of claim 18, wherein identifying the context associated with the computer-generated reality environment includes identifying an application being utilized at the electronic device.

23. The method of claim 18, wherein identifying the context associated with the computer-generated reality environment includes detecting a conversation topic.

24. The method of claim 18, wherein identifying the context associated with the computer-generated reality environment includes detecting an activity.

25. The method of claim 18, wherein the context associated with the computer-generated reality environment is based on historical information.

* * * * *